Jan. 19, 1926.

F. H. NORMAN

TRACTOR GUIDE

Filed July 23, 1925

1,570,276

Inventor

F. H. Norman

By D. Swift his Attorney

Patented Jan. 19, 1926.

1,570,276

UNITED STATES PATENT OFFICE.

FRANCIS HAROLD NORMAN, OF ROANN, INDIANA.

TRACTOR GUIDE.

Application filed July 23, 1925. Serial No. 45,542.

*To all whom it may concern:*

Be it known that I, FRANCIS H. NORMAN, a citizen of the United States, residing at Roann, in the county of Wabash, State of Indiana, have invented a new and useful Tractor Guide; and I do hereby declare the following to be a full, clear, and exact description of the invention, such as will enable others skilled in the art to which it appertains to make and use the same.

The invention relates to tractor guiding devices used in connection with the steering mechanism of a conventional form of tractor, and has for its object to provide a device which may be easily attached to a tractor and steering mechanism, and forming means whereby upon a turning of the tractor to the right away from a furrow, a spring will be tensioned and a pull imparted on the steering mechanism, whereby the tractor wheels will be brought to a straight position, and the tractor guided in parallel relation to a furrow. The device is particularly designed to allow the operator to release the steering mechanism when desired, and to attend plows drawn by the tractor, for instance to clean trash and weeds from the plows.

A further object is to provide a coiled spring connected to the tractor body, and adjustably connected to a rod, which rod is provided with a hook hooked over the steering knuckle arm, whereby upon turning of the wheels to the right, the spring will be tensioned for imparting a pull on the steering knuckle arm and returning the wheels to straight position.

A further object is to provide an adjustable clamp on the steering mechanism drag link, in a bearing of which is slidably mounted the spring carried rods, and which bracket maintains the hook of the rod in the plane of the steering knuckle arm at all times, particularly when a turn is made to the left, at which time the arm of the steering knuckle moves out of engagement with the hook.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
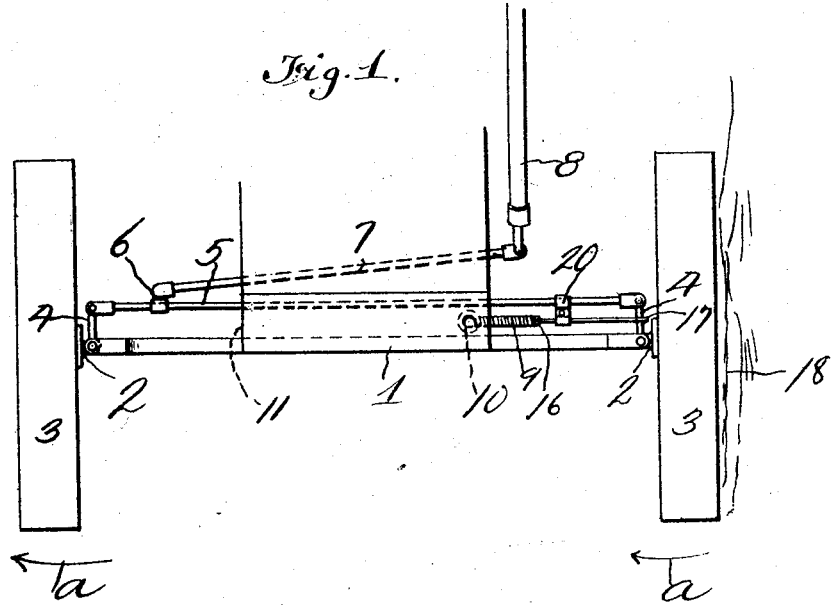
Figure 1 is a top plan view of the steering mechanism of a tractor, showing the guiding device applied thereto.
Figure 2:
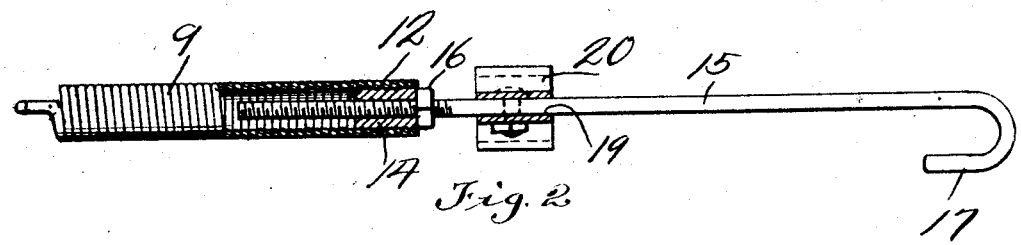
Figure 2 is a front elevation of the guide device, part being shown in section to better show the structure.

Referring to the drawing, the numeral 1 designates a conventional form of front axle of a tractor, 2 the steering knuckles and 3 the tractor guide wheels which are carried by the steering knuckles. Extending rearwardly from the steering knuckles 2 are arms 4, which arms are connected together by means of a drag link 5, to which is connected at 6 a rod 7, which is connected to the steering post 8 in the usual manner whereby the drag link 5 may be longitudinally moved in either direction for turning the wheel 3 during a steering operation to the right or left. It has been found where conventional forms of steering mechanisms are used on tractors, especially when dragging a plow the tendency is for the tractor or steering wheels to move to the right away from the furrow, consequently the entire time of the operator is required for the steering operation, and which operation is a laborious one. To obviate the above difficulty and allow the operator to devote a portion of his time to the plow or plows, for instance cleaning weeds and vines therefrom, the present device is primarily designed. The device comprises a coiled spring 9, which has one of its ends secured at 10 to the radiator 11 of the tractor. Welded into the other end of the coiled spring 9 at 12 is a sleeve 14 through which the guide rod 15 is threaded, therefore it will be seen that the tension imparted on the guide rod 15 by the coiled spring 9 may be varied according to the amount of pull desired to impart on the knuckle joint arm 4 for returning the steering mechanism to a position where the tractor will be guided in parallel relation to a furrow, and in a straight direction. The guide rod 15 is provided with a lock nut 16, which cooperates with the end of the sleeve 14 for locking the rod 15 in any adjusted position. The outer end of the guide rod 15 terminates in a downwardly and inwardly extending hook 17 which hooks over the outer side of the steering knuckle arm 4, whereby when the steering wheels 3 are moved in the direction of the arrows *a*, the arms 4 will impart a pull on the guide rod 15, thereby tensioning the coiled spring 9, which will immediately pull the arm 4 inwardly and return the steering wheels 3 to straight line positions. When guiding a tractor along a furrow 18, the wheels 3 are constantly forced to the right by the action of the same against the side of the furrow, therefore it will be seen that the coiled spring 9 will overcome this action and maintain the steering wheels 3 in position where the tractor will move in a straight line, and at the same time the operator of the tractor may devote his attention to other duties, for instance to the plow or plows dragged by the tractor. When the wheels 3 are moved to the left, it will be seen that the hooks 17 will move out of engagement with the arm 4 and consequently under normal steering conditions the tractor can be steered in the usual manner. Guide rod 15 is slidably mounted in a bearing 19 of a clamp 20, which is clamped to the drag link 5, therefore it will be seen that the device may be easily and quickly applied to a running gear of a conventional form of tractor without modifying the construction thereof. It will also be seen that the device is simple in construction, the parts reduced to a minimum and the tractor maintained in proper relative parallel position to a furrow during a plowing operation; at the same time the device will not interfere with the manual steering of the tractor.

The invention having been set forth what is claimed as new and useful is:—

A tractor guide device comprising a coiled spring anchored to a support above an axle, a sleeve secured in the other end of the coiled spring, a guide rod threaded in said sleeve and extending towards a knuckle arm, a lock nut carried by said rod, a bracket carried by a drag link and in which the guide rod is slidably mounted, the outer end of said guide rod being provided with a hook extending over the outer side of the knuckle arm.

In testimony whereof I have signed my name to this specification.

FRANCIS HAROLD NORMAN.